March 24, 1925.                                            1,530,484
W. E. DUNSTON
BUMPER ATTACHING AND SUPPORTING MEANS
Filed May 8, 1923
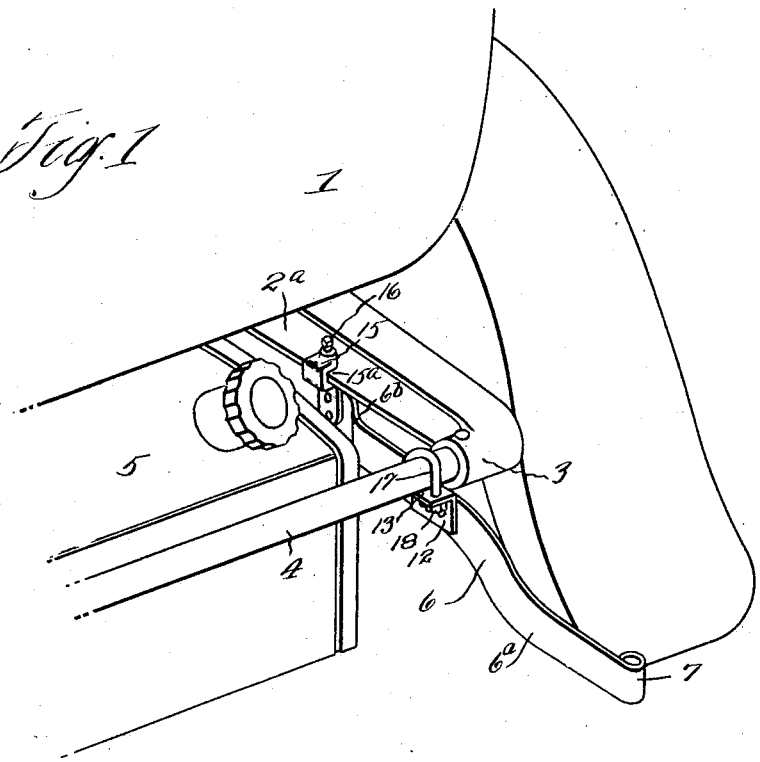
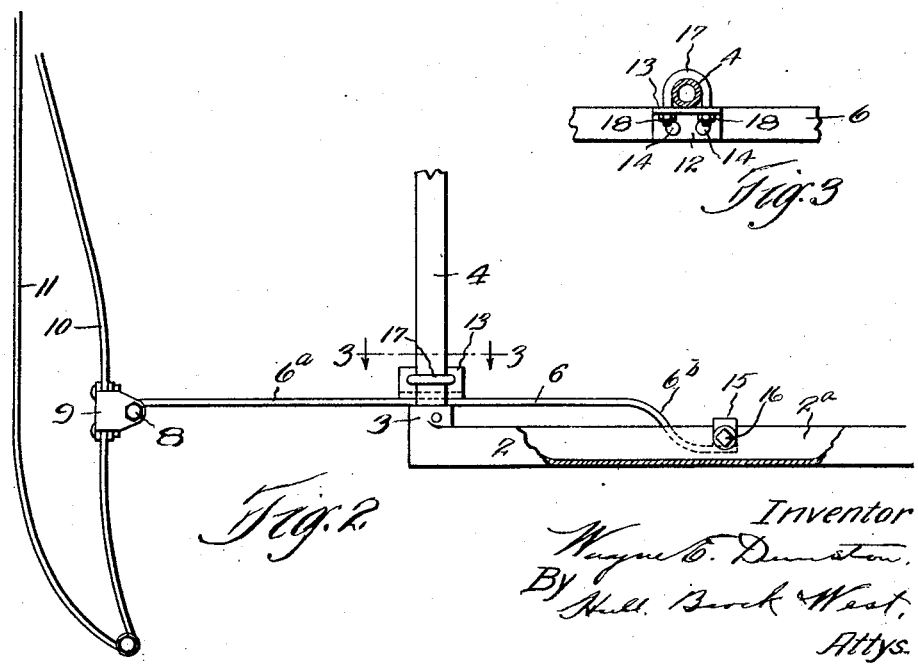
Inventor
Wayne E. Dunston
By Hull, Beck & West,
Attys.

Patented Mar. 24, 1925.

1,530,484

UNITED STATES PATENT OFFICE.

WAYNE E. DUNSTON, OF DETROIT, MICHIGAN, ASSIGNOR TO THE C. G. SPRING & BUMPER COMPANY, OF DETROIT, MICHIGAN, A CORPORATION OF DELAWARE.

BUMPER ATTACHING AND SUPPORTING MEANS.

Application filed May 8, 1923. Serial No. 637,459.

*To all whom it may concern:*

Be it known that I, WAYNE E. DUNSTON, a citizen of the United States, residing at Detroit, in the county of Wayne and State of Michigan, have invented a certain new and useful Improvement in Bumper Attaching and Supporting Means, of which the following is a full, clear, and exact description, reference being had to the accompanying drawings.

This invention relates to automobile bumpers, and more particularly to the means for securing the same, in an efficient manner, to special types or makes of vehicle frames. It is the general purpose and object of the invention to provide means whereby the bumpers may be connected to and supported by such members in a particularly effective manner. I accomplish the foregoing object in and through the construction and arrangement of parts shown in the accompanying drawings, wherein Fig. 1 represents a perspective view of the rear end of an automobile having my invention applied thereto; Fig. 2 a detail in plan of the rear end of the frame of such vehicle, showing my invention applied thereto in connection with a bumper; and Fig. 3 a sectional detail corresponding to the line 3—3 of Fig. 2.

Describing the various parts herein by reference characters, 1 represents the rear end of the body of an automobile and 2 the rear end of one of the two channeled side frame members thereof, the said member being provided at its extreme end with a socket 3 for the reception of one end of a cross tube 4, which connects the said side member with a like member on the opposite side (not shown) and provides a transverse protection for, and at the rear of, the tank 5.

For the purpose of supporting a bumper in an effective manner from the rear end of the frame of a vehicle of this type, the following construction is provided:—6 denotes an arm, preferably of spring-plate material, having at its rear or outer end an eye 7 which is adapted to receive a bolt 8 securing a clamp 9 thereto, the said clamp engaging the rear bar 10 of a bumper, the front bar of the bumper being indicated at 11. The rear end of the arm 6 is deflected downwardly, as indicated at 6ª, in order to support the bumper at the proper vertical distance from the ground and in proper relation to the parts of the vehicle which it is designed to protect.

Intermediate the ends of the arm 6 there is mounted an angular bracket 12, having a horizontal inwardly extending flange 13, the vertical flange being shown as riveted to the arm 6—see 14. The front or inner end of the arm 6 is bent outwardly, as shown at 6ᵇ, and then is extended substantially parallel with the side member 2, so as to come beneath the bottom flange thereof when the rear or outer end of the arm is at right angles to the cross member 4. Riveted or otherwise suitably secured to the front end of the arm 6 is a bracket, indicated generally at 15, and having a horizontal slot 15ª therein. This slot is adapted to receive the lower flange 2ª of the side member and to be secured to said flange by a set screw 16.

The arm extends rearwardly from the bracket beneath the cross member or tube 4 and is suspended from said member by means of a U-shaped bolt 17, the lower ends of which project through the flange 13 and are provided with nuts 18.

The construction disclosed herein not only adapts the bumper supporting arms to convenient application to a frame such as shown herein, but enables the parts to which the supporting arm is adapted to sustain the shocks and other ordinary incidents of use.

Having thus described my invention, what I claim is:

1. A bumper supporting arm having at one end means for supporting a bumper therefrom and having, at its opposite end, an attaching device adapted to be secured to one of the flanges of a side frame member, and means for suspending an intermediate portion of said arm from a vehicle cross member.

2. A bumper supporting arm having at one end means for supporting a bumper therefrom and having, at its opposite end, a slotted bracket adapted to receive and be secured to one of the flanges of a side frame member, and means for suspending an intermediate portion of said arm from a vehicle cross member.

3. A bumper supporting arm having at one end means for supporting a bumper therefrom and having, at its opposite end, a slotted bracket adapted to receive and be secured to one of the flanges of a side frame member, the said arm having intermediate of its ends a flange adapted to extend beneath a cross member, and a U-shaped bolt adapted to extend over said member and through the said flange.

4. A bumper supporting arm having at one end means for supporting a bumper therefrom and having, at its opposite end, means for securing the same to a side frame member, the said arm having, intermediate of its ends, a flange or projection adapted to extend beneath a cross member, and a U-shaped bolt adapted to extend over said member and through the said flange or projection.

5. The combination, with a side frame member having a flange and a cross member connected to the former member, of a bumper supporting arm having means for attaching a bumper to one end thereof, a horizontally extending flange or projection carried by said bumper intermediate of the ends thereof, means cooperating with said flange or projection for securing the same and the said arm to the cross member, a slotted clamping member carried by the opposite end of the said arm and adapted to be applied to a flange of the frame member, and a set screw cooperating with the slot of said member for securing the same to said flange.

6. The combination, with the flanged side frame member of a vehicle and a cross member connected to the said side frame member, of a bumper supporting arm having means at one end for supporting a bumper therefrom and having its opposite end bent outwardly to extend beneath a flange of the said frame member, the said end having an upwardly extending clamping member adapted to receive said flange and to be secured thereto, and means for suspending the intermediate portion of said arm from said cross member.

In testimony whereof, I hereunto affix my signature.

WAYNE E. DUNSTON.